(12) United States Patent
Yeo et al.

(10) Patent No.: US 9,645,668 B2
(45) Date of Patent: May 9, 2017

(54) MOBILE TERMINAL AND METHOD FOR CONTROLLING THE SAME

(71) Applicant: LG ELECTRONICS INC., Seoul (KR)

(72) Inventors: Inkwan Yeo, Seoul (KR); Younghak Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/625,347

(22) Filed: Feb. 18, 2015

(65) Prior Publication Data

US 2016/0026321 A1  Jan. 28, 2016

(30) Foreign Application Priority Data

Jul. 22, 2014  (KR) .......................... 10-2014-0092821

(51) Int. Cl.
G06F 3/041 (2006.01)
G06F 3/0488 (2013.01)
G06F 3/01 (2006.01)

(52) U.S. Cl.
CPC ............ G06F 3/0416 (2013.01); G06F 3/017 (2013.01); G06F 3/0488 (2013.01); G06F 3/04883 (2013.01); G06F 2203/04808 (2013.01)

(58) Field of Classification Search
CPC ...... G06F 3/04883; G06F 3/017; G06F 3/041; G06F 2203/04808; G06F 3/0488
USPC .................... 345/173, 174; 715/863
See application file for complete search history.

(56) References Cited

U.S. PATENT DOCUMENTS

| 8,717,302 | B1 | 5/2014 | Qin et al. |
| 2007/0222765 | A1* | 9/2007 | Nyyssonen ........... G06F 1/1607 345/173 |
| 2008/0278455 | A1 | 11/2008 | Atkins et al. |
| 2009/0183930 | A1* | 7/2009 | Yang ................... G06F 3/04845 178/18.03 |

(Continued)

FOREIGN PATENT DOCUMENTS

| EP | 2284674 | 2/2011 |
| KR | 10-2009-0070491 | 7/2009 |
| KR | 10-2013-0138659 | 12/2013 |

OTHER PUBLICATIONS

European Patent Office Application Serial No. 15162560.5, Search Report dated Dec. 9, 2015, 8 pages.

(Continued)

*Primary Examiner* — Koosha Sharifi-Tafreshi
(74) *Attorney, Agent, or Firm* — Lee, Hong, Degerman, Kang & Waimey

(57) ABSTRACT

A mobile terminal and a method for controlling the same are disclosed. The mobile terminal includes a touch screen, and a controller for causing the mobile terminal to enter a sleep mode, receiving a touch input applied to a first point of the touch screen during the sleep mode, receiving a first drag input applied from a second point to a third point of the touch screen during the sleep mode and while the touch input is maintained, wherein a first angle is defined between a line that extends from the first point to the second point and a line that extends from the first point to the third point, and performing a defined operation when the first angle meets or exceeds a threshold angle.

18 Claims, 32 Drawing Sheets

(56) References Cited

U.S. PATENT DOCUMENTS

| | | | |
|---|---|---|---|
| 2010/0299638 A1* | 11/2010 | Choi | G06F 3/04883 |
| | | | 715/835 |
| 2011/0130170 A1 | 6/2011 | Han et al. | |
| 2012/0071149 A1* | 3/2012 | Bandyopadhyay | G06F 1/1643 |
| | | | 455/418 |
| 2012/0191993 A1* | 7/2012 | Drader | G06F 1/3215 |
| | | | 713/320 |
| 2014/0071063 A1* | 3/2014 | Kuscher | G06F 3/041 |
| | | | 345/173 |
| 2014/0132555 A1* | 5/2014 | Becouarn | G06F 3/0488 |
| | | | 345/174 |
| 2015/0033326 A1* | 1/2015 | Fang | G06F 3/04842 |
| | | | 726/16 |
| 2015/0105128 A1* | 4/2015 | Huang | H04B 1/3888 |
| | | | 455/575.8 |

OTHER PUBLICATIONS

Korean Intellectual Property Office Application Serial No. 10-2014-0092821, Notice of Allowance dated Nov. 20, 2012, 2 pages.
G2 review, http://vemberhs.blog.me/20194883453, Sep. 1, 2013, 18 pages.

* cited by examiner

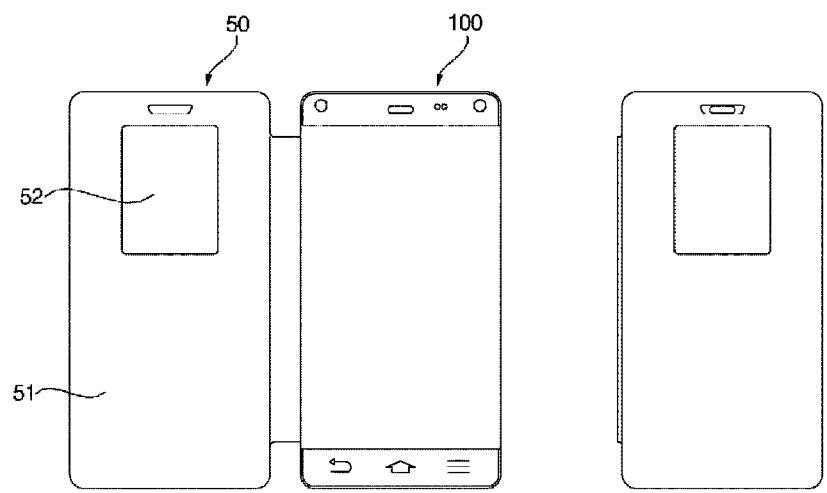

PRIOR ART

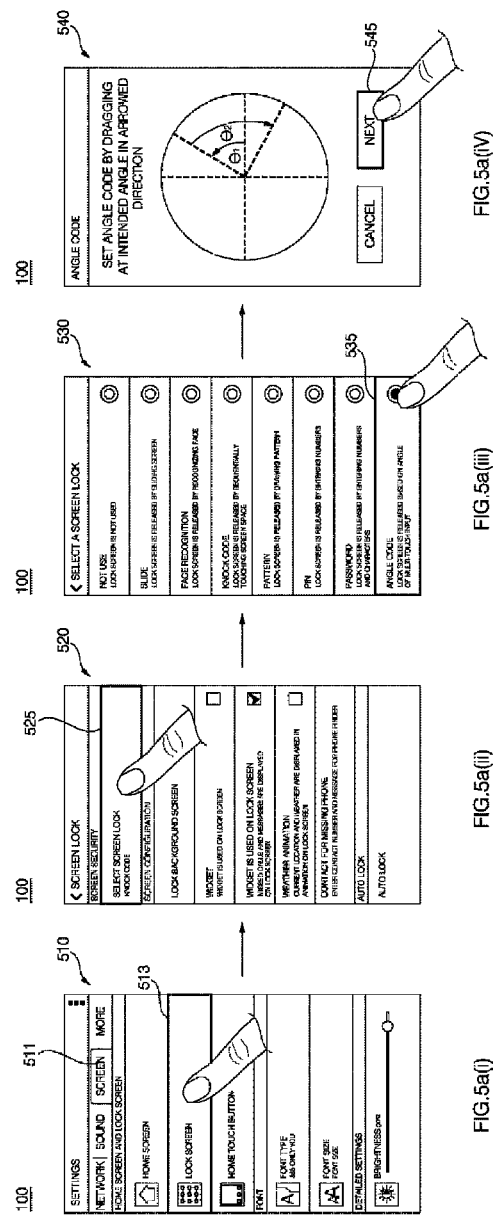

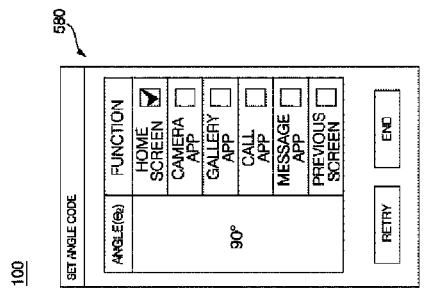
FIG.5a(viii)
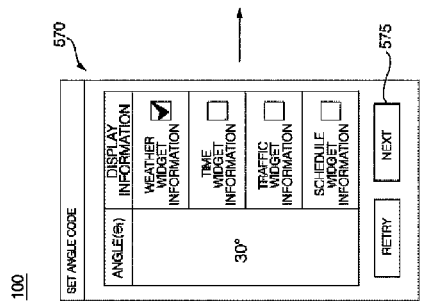
FIG.5a(vii)
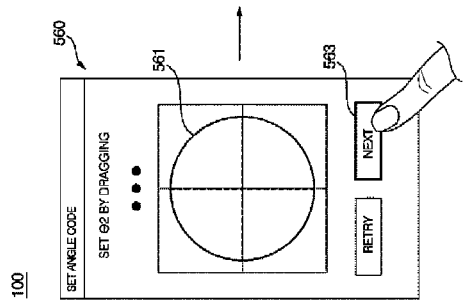
FIG.5a(vi)
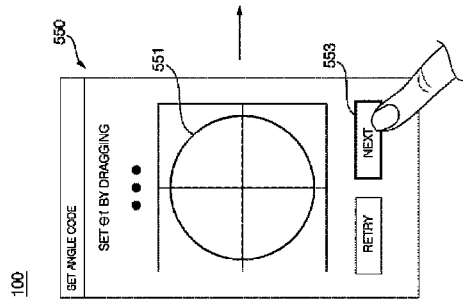
FIG.5a(v)

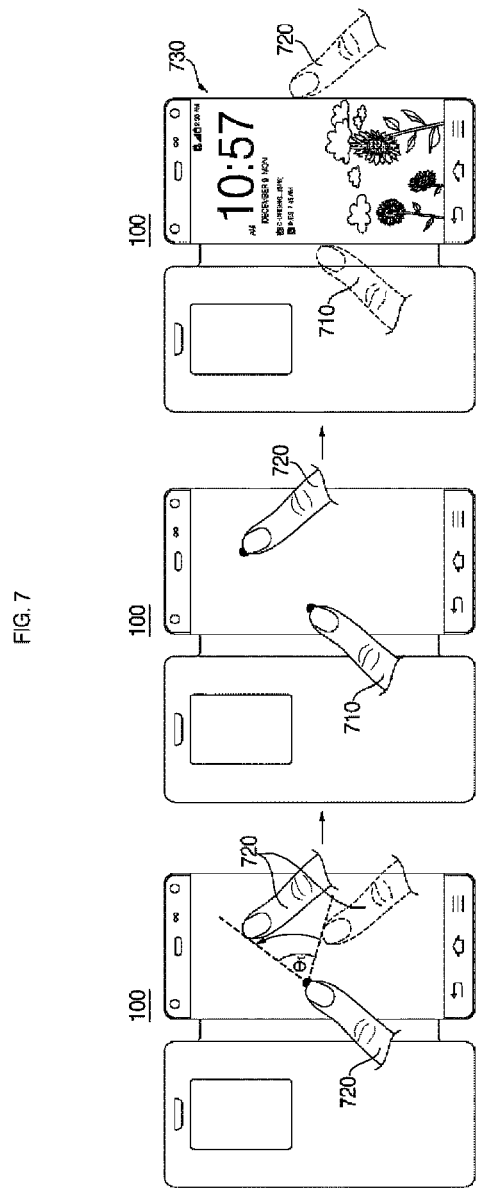

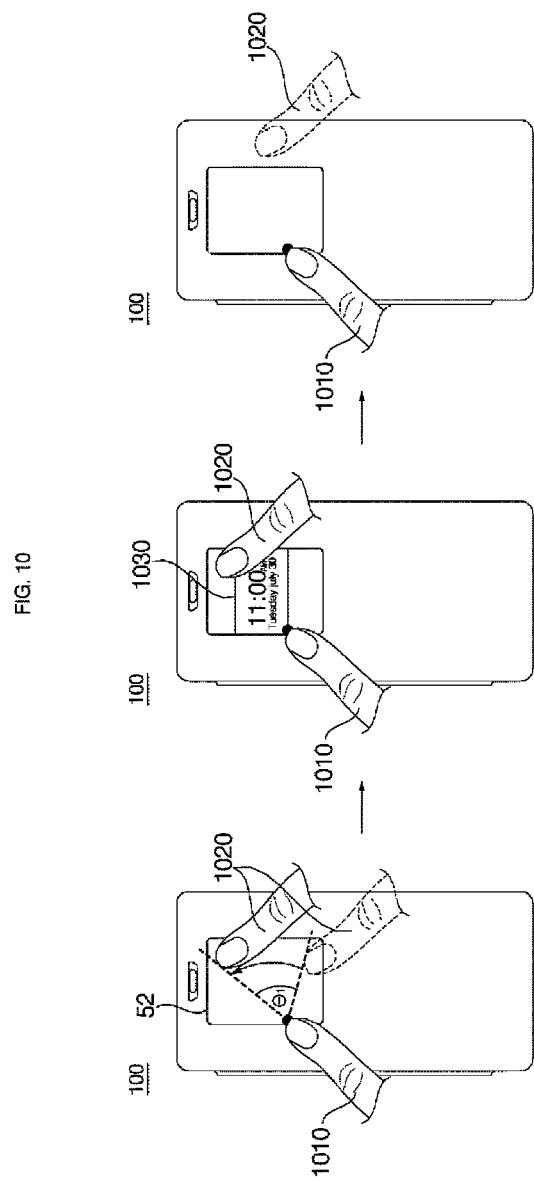

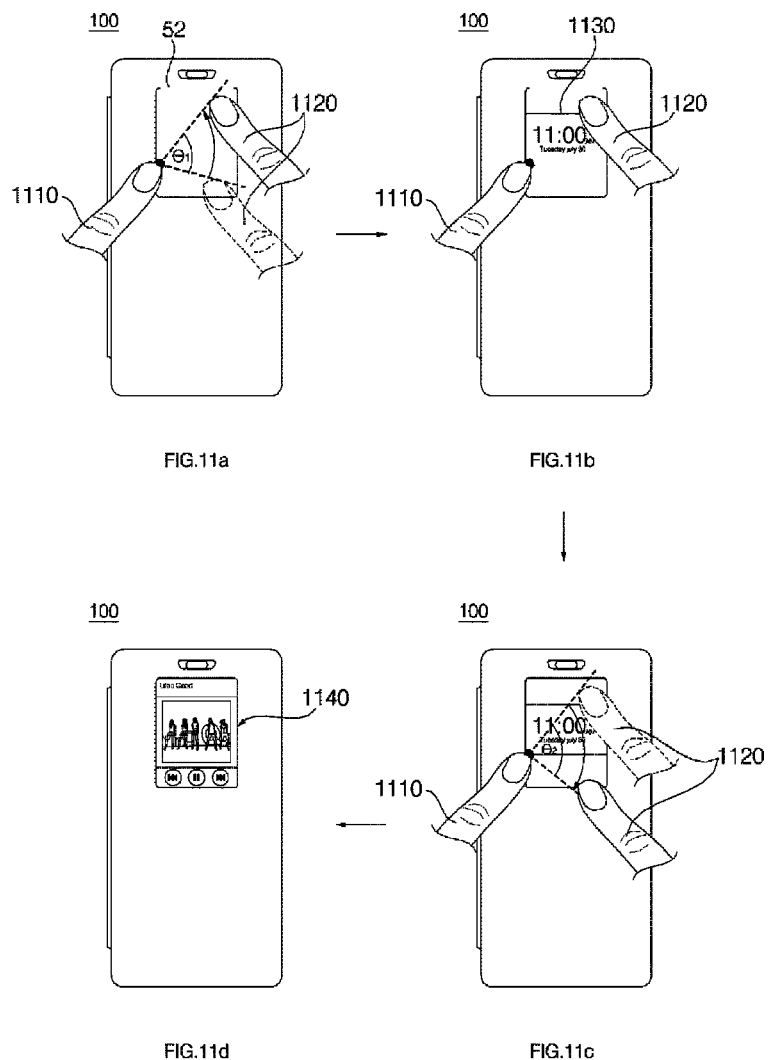

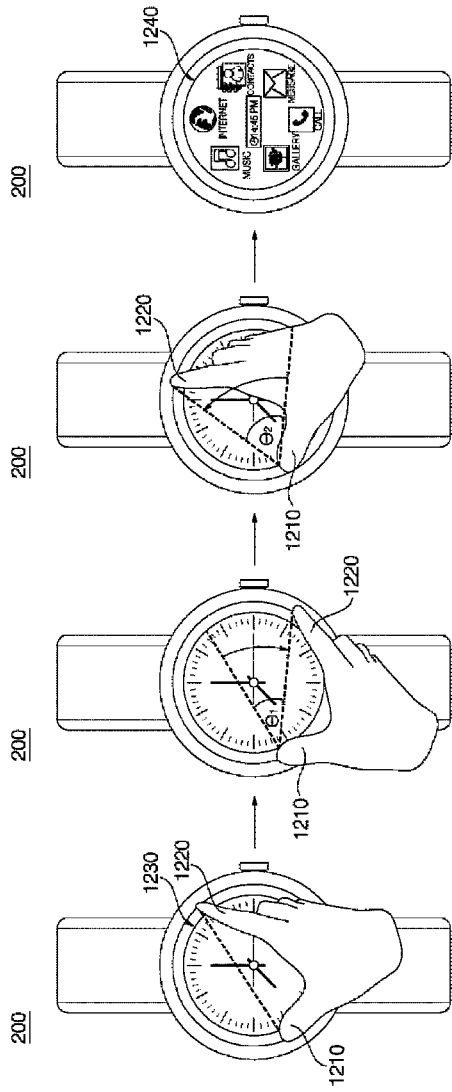

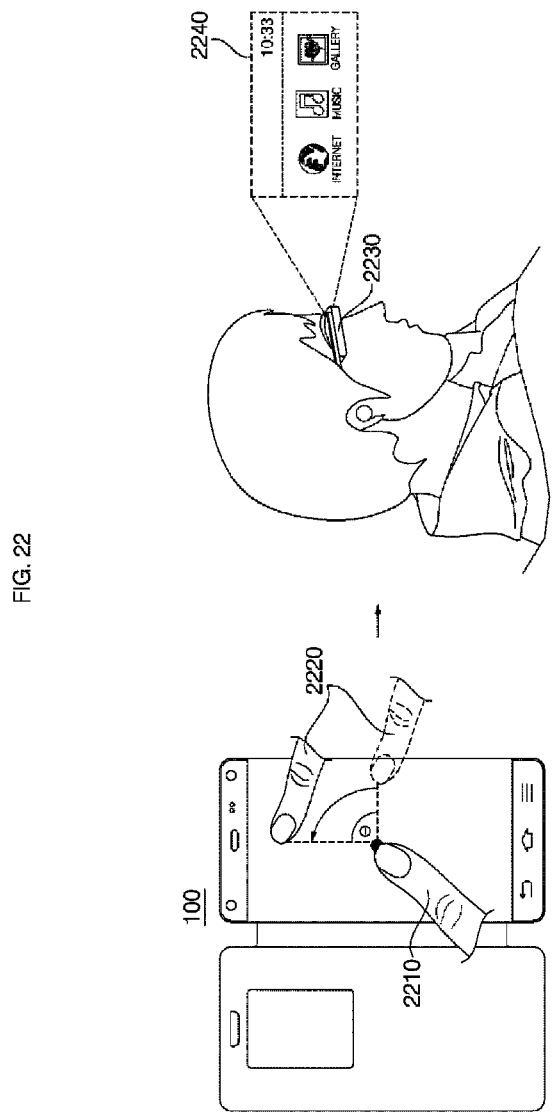

MOBILE TERMINAL AND METHOD FOR CONTROLLING THE SAME

CROSS-REFERENCE TO RELATED APPLICATION

Pursuant to 35 U.S.C. §119(a), this application claims the benefit of earlier filing date and right of priority to Korean Patent Application No. 10-2014-0092821, filed on Jul. 22, 2014, the contents of which are hereby incorporated by reference in its entirety.

BACKGROUND OF THE INVENTION

1. Field of the Disclosure

The present invention relates to a mobile terminal and a method for controlling the same, and more particularly, to a mobile terminal for readily releasing a screen lock state based on a multi-touch input to a touch screen in a sleep mode and a method for controlling the same.

2. Background of the Disclosure

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components.

A mobile terminal having a touch screen provides a screen-on function in various manners in order to reduce unnecessary battery consumption. Particularly, a knock-based screen-on scheme is popular due to its use convenience and novelty.

As illustrated in FIG. 3a, for example, the mobile terminal provides a 'screen-on function (or knock-on function)' that enables a user to turn on a screen simply with a touch input made by tapping on a touch screen disposed on the front surface of the body of the mobile terminal in a sleep mode.

In addition, the mobile terminal having the touch screen provides a screen locking function in various manners to limit unintended touch inputs of a user in a standby mode or to restrict access from an unauthorized third party. A screen lock release scheme using a knock code is widely used in view of its use convenience and novelty.

As illustrated in FIG. 3b, for example, the mobile terminal provides a 'screen lock release function (or knock code function)' that unlock the mobile terminal based on a plurality of touch inputs applied by sequentially tapping on the touch screen disposed on the front surface of the mobile terminal according to a predetermined rule in the sleep mode.

This screen-on function or screen lock release function is executed based on a single touch input applied with one finger, thus limiting various patterns of touch inputs.

Accordingly, there is a pressing need for a method for executing a screen-on function or a screen lock release function more easily using a touch input other than a single touch input.

SUMMARY OF THE DISCLOSURE

Accordingly, an object of the present invention is to address the above-noted and other problems.

Another object of the present invention to provide a mobile terminal for releasing a screen lock state based on angle information about a multi-touch input to a touch screen in a sleep mode, and a method for controlling the same.

Another object of the present invention is to provide a mobile terminal for performing a predetermined operation simultaneously with releasing a screen lock state, based on gesture information about a multi-touch input to a touch screen in a sleep mode, and a method for controlling the same.

To achieve these and other advantages and in accordance with the purpose of the present invention, as embodied and broadly described herein, the present invention provides in one aspect a mobile terminal including a touch screen, and a controller for causing the mobile terminal to enter a sleep mode, receiving a touch input applied to a first point of the touch screen during the sleep mode, receiving a first drag input applied from a second point to a third point of the touch screen during the sleep mode and while the touch input is maintained, wherein a first angle is defined between a line that extends from the first point to the second point and a line that extends from the first point to the third point, and performing a defined operation when the first angle meets or exceeds a threshold angle.

In another aspect, the present invention provides a method for controlling a mobile terminal, including entering a sleep mode, receiving a touch input applied to a first point of a touch screen during the sleep mode, receiving a first drag input applied from a second point to a third point of the touch screen during the sleep mode and while the touch input is maintained, wherein a first angle is defined between a line that extends from the first point to the second point and a line that extends from the first point to the third point, and performing a defined operation when the first angle meets or exceeds a threshold angle.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 1d is a conceptual view of an exemplary mobile terminal having a protection cover;

FIGS. 5a(i) to 5a(viii) illustrate an operation of a mobile terminal for presetting angles of a multi-touch input and a screen lock function corresponding to the angles of the multi-touch input;

FIG. 7 illustrates an operation of a mobile terminal for displaying a lock screen based on a first angle of a multi-touch input;

FIG. 10 illustrates an operation of a mobile terminal for displaying predetermined information based on a first angle of a multi-touch input, while a protection cover is closed in the mobile terminal;

FIGS. 11a to 11d illustrate an operation of a mobile terminal for performing a predetermined operation simultaneously with releasing a screen lock state based on first and second angles of a multi-touch input, while a protection cover is closed in the mobile terminal;

FIG. 12 illustrates an operation of a smart watch for performing a predetermined operation simultaneously with releasing a screen lock state based on first and second angles of a multi-touch input;

FIGS. 21 and 22 illustrate an operation of a mobile terminal for unlocking a wearable device based on a multi-touch input to a touch screen.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
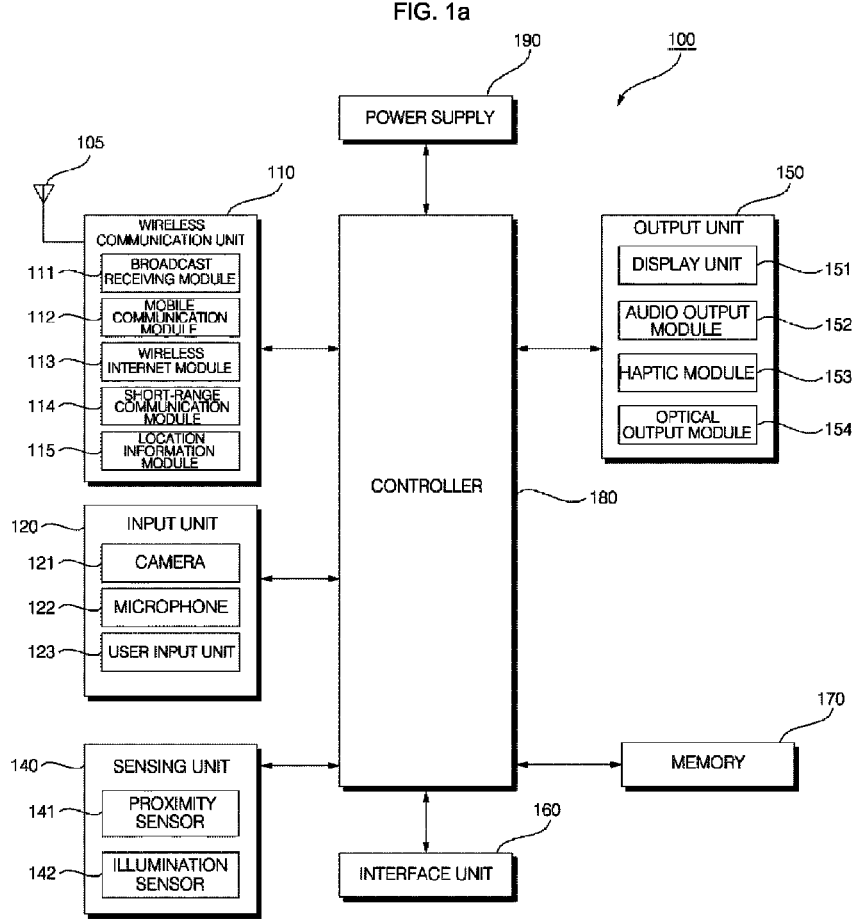
FIG. 1a is a block diagram of a mobile terminal according to the present disclosure.
Figure 1B:
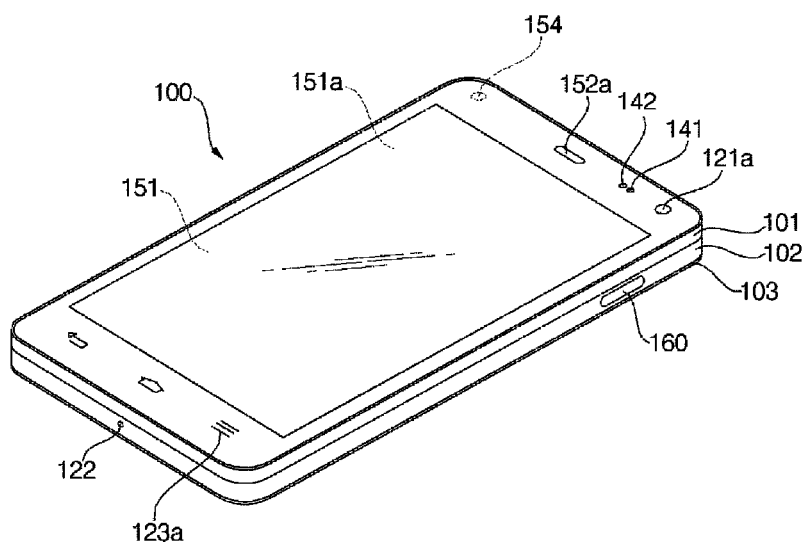
FIGS. 1b and 1c are conceptual views of an example of the mobile terminal, viewed from different directions.
Figure 1C:
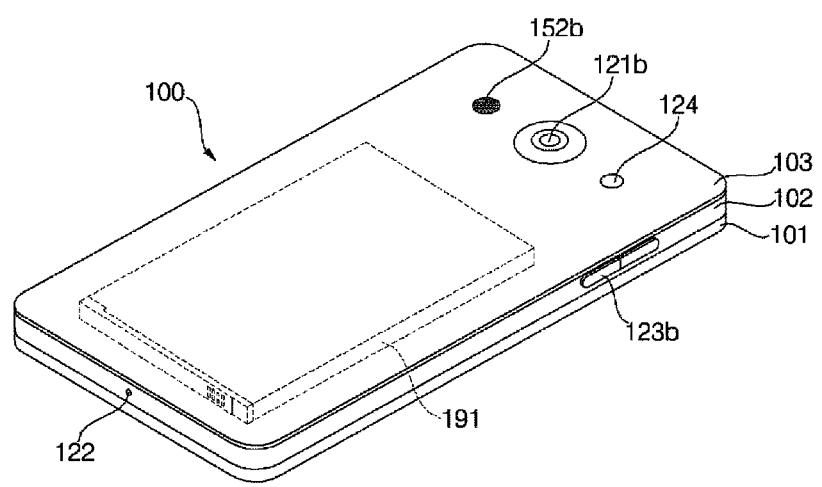

FIG. 1a is a block diagram of a mobile terminal according to the present invention, FIGS. 1b and 1c are conceptual views of an example of the mobile terminal according to the present invention, viewed from different directions, and FIG. 1d is a conceptual view of an example of a mobile terminal having a protection cover.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1a, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1a, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1a-1c according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1a, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or can perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1b and 1c, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1b and 1c depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1a). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1b illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1c, a flash 124 is shown adjacent to the second camera 121b. When an image of a subject is captured with the camera 121b, the flash 124 may illuminate the subject.

As shown in FIG. 1b, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Referring to FIG. 1d, a protection cover 50 includes a quick cover 51 for protecting the mobile terminal 100 from an external impact and a quick window 52 configured to allow a part of the display unit 151 to be visible from the outside of the mobile terminal 100.

The quick cover 51 may be formed of a material such as leather, metal, plastic, or synthetic fiber. The quick window 52 may be formed of a transparent material or may be formed into an opening.

The mobile terminal 100 determines whether the protection cover 50 is open or closed by sensing at least one magnet built in the quick cover 51. If the mobile terminal 100 determines that the protection cover 50 is closed, the mobile terminal 100 may activate only a display area corresponding to the quick window 52 according to a user command or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 may transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 2:
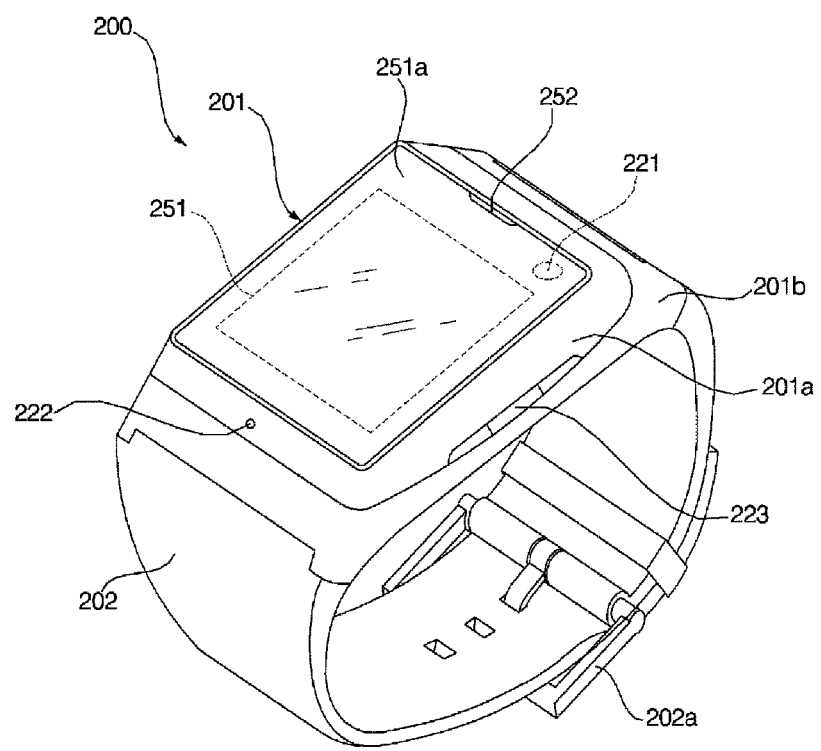
FIG. 2 is a perspective view of an exemplary watch-type mobile terminal according to an embodiment of the present invention.
Figure 3A:
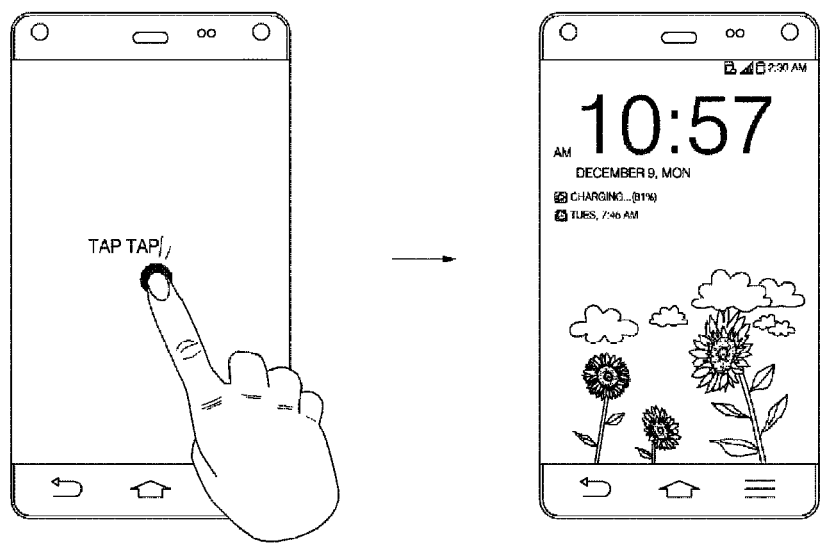
FIGS. 3a and 3b illustrate a screen-on function and a screen lock release function in a conventional mobile terminal.
Figure 3B:
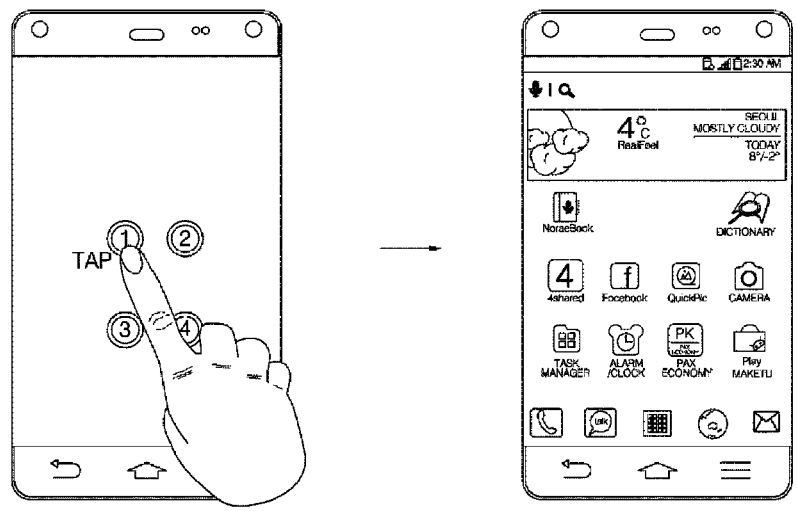

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1*a*-1*c*.

The main body 201 may include a case having a certain appearance. As illustrated, the case may include a first case 201*a* and a second case 201*b* cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251*a* is positioned on the first case 201*a* to form a front surface of the terminal body together with the first case 201*a*.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202*a*. The fastener 202*a* may be implemented into a buckle type, a snap-fit hook structure, a Velcro® type, or the like, and include a flexible section or material. The drawing illustrates an example that the fastener 202*a* is implemented using a buckle.

Further preferred embodiments will be described in more detail with reference to additional drawing figures. It is understood by those skilled in the art that the present features can be embodied in several forms without departing from the characteristics thereof.

The configurations of the mobile terminals according to the present invention have been described above with reference to FIGS. 1*a* to 2. Now, a detailed description will be given of a mobile terminal for releasing a screen lock state based on angle information about a multi-touch input to a touch screen in a sleep mode, and a method for controlling the same according to an embodiment of the present invention.

Figure 4:
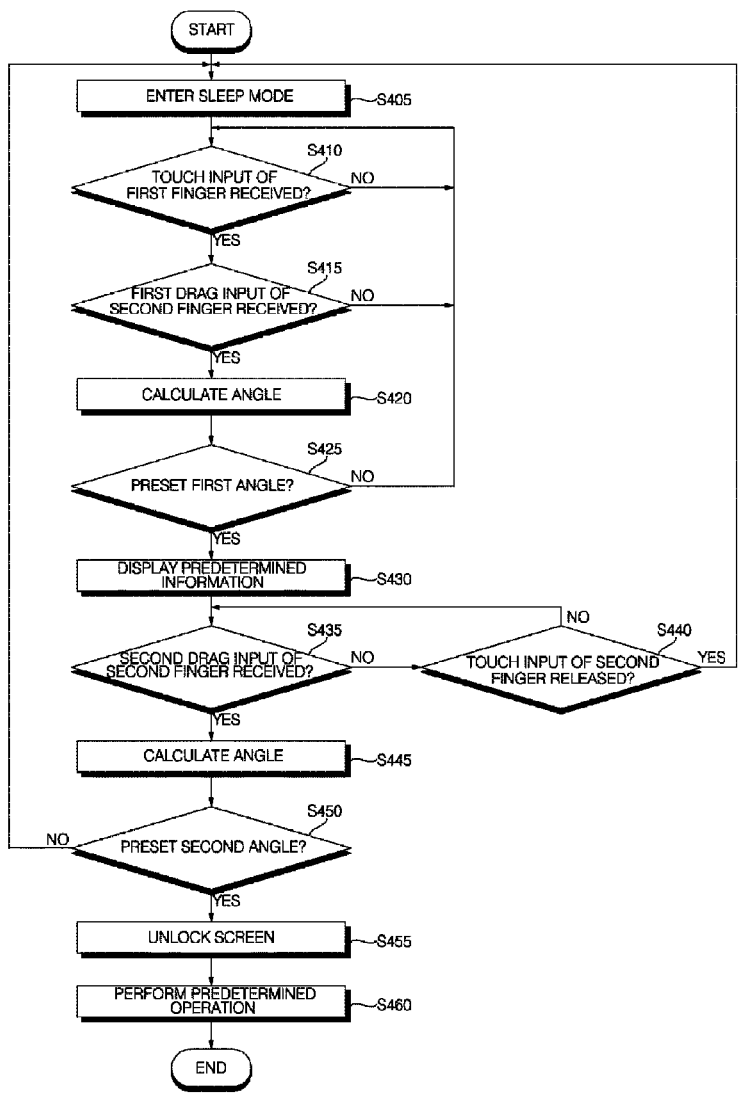
FIG. 4 is a flowchart illustrating an operation of a mobile terminal according to an embodiment of the present invention.

FIG. 4 is a flowchart illustrating an operation of a mobile terminal according to an embodiment of the present invention.

Referring to FIG. 4, the controller 180 displays an operation screen corresponding to a menu or operation selected by a user command or the like on the display unit 151. The displayed operation screen may be, for example, any of a home screen, an app screen, a message screen, a call screen, an image or video viewer screen, a broadcasting screen, a map screen, a Web page screen, various application execution screens, etc.

Upon selection of an external key for entering a sleep mode or upon elapse of a predetermined time without any user input while the operation screen is displayed, the controller 180 switches from an active mode to the sleep mode, for power saving or other purposes (S405).

For the convenience of description, a mode in which power is blocked to the display unit 151 in the absence of an input signal such as a touch input or a key input for a predetermined time with power supplied to the mobile terminal 100 is referred to as 'sleep mode' and a mode in which power is supplied to the display unit 151 is referred to as 'active mode'. In the sleep mode, as power is blocked to the display unit 151, an output function is deactivated, whereas a touch sensor with an input function is activated.

In the sleep mode, the controller 180 determines whether a touch input applied by a first finger has been received at a point of the display unit 151 (S410).

Upon receipt of the touch input applied by the first finger in step S410, the controller 180 determines whether a first drag input applied in a first direction by a second finger has been received in an area near to the point touched by the first finger, with the touch input received (S415). The first direction may be a clockwise or counterclockwise direction.

Upon receipt of the first drag input applied by the second finger in step S415, the controller 180 calculates an angle between a first line connecting the reception point of the touch input to a starting point of the first drag input and a second line connecting the reception point of the touch input to an ending point of the first drag input (S420).

If the angle between the first and second lines is a first angle preset by the user (S425), the controller 180 switches the mobile terminal from the sleep mode to the active mode and displays predetermined information corresponding to the first angle in an area of the display unit 151 (S430). The predetermined information may be, but not limited to, time widget information, weather widget information, traffic widget information, or schedule widget information, which is information that a user frequently checks. The predetermined information is preferably displayed while the second finger keeps touching the ending point of the first drag input.

If the touch input of the second finger is released at the ending point of the first drag input (i.e., the second finger is lifted off the screen) (S440), the controller 180 switches the mobile terminal from the active mode to the sleep mode. Therefore, the controller 180 turns off the screen displayed on the display unit 151.

Meanwhile, the controller 180 determines whether a second drag applied by the second finger in a second direction has been received, starting from the ending point of the first drag input (S435). The second direction may be opposite to the first direction.

Upon receipt of the second drag input of the second finger in step S435, the controller 180 calculates an angle between a third line connecting the reception point of the touch input to a starting point of the second drag input and a fourth line connecting the reception point of the touch input to an ending point of the second drag input (S445).

If the angle between the third and fourth lines is a second angle preset by the user (S450), the controller 180 immediately performs a predetermined operation corresponding to the second angle, simultaneously with releasing a screen lock state (S455 and S460).

According to another embodiment, if the angle between the third and fourth lines is the preset second angle, the controller 180 may display a previous operation screen (i.e., an operation screen displayed before the sleep mode is placed) on the display unit 151, simultaneously with releasing a screen lock state.

In this embodiment, since it is difficult to input the preset first and second angles accurately by the first and second drag inputs, an error range of, for example, ±5 or ±10 degrees is preferably set.

It has been described in this embodiment that a screen lock release function is performed only when both preset angles are satisfied, which should not be construed as limiting the present invention. Therefore, those skilled in the art will clearly understand that if one preset angle is satisfied or three or more preset angles are all satisfied by the afore-described touch input and drag input, the screen lock release function may be performed.

As described above, the mobile terminal may immediately perform a predetermined operation simultaneously with releasing a screen lock state, based on angle information about a multi-touch input to the touch screen in the sleep mode according to the embodiment of the present invention.

FIGS. 5a(i) to 5a(viii) are views referred to for describing an operation of a mobile terminal for presetting angles of a multi-touch input and a screen lock function corresponding to the angles of the multi-touch input.

Referring to FIGS. 5a(i) to 5a(viii), the mobile terminal 100 displays a settings screen for setting information about networks, sounds, screens, etc. on the display unit 151 according to a user command or the like.

Upon selection of a screen setting menu 511 displayed at a top part of the settings screen, the mobile terminal 100 displays a screen setting screen 510 for setting screen-related information on the display unit 151.

Upon selection of a lock screen menu 513 in the screen setting screen 510, the mobile terminal 100 displays a lock screen setting screen 520, as illustrated in FIG. 5a(ii). Upon selection of a screen lock selection menu 525 in the lock screen setting screen 520, the mobile terminal 100 displays a screen lock selection screen 530, as illustrated in FIG. 5a(iii). The screen lock selection screen 530 includes various lock screen menus for locking a screen.

Upon selection of an angle code menu 535 in the screen lock selection screen 530, the mobile terminal 100 displays an angle code guide screen 540 including notification information about angle code setting on the display unit 151. Accordingly, the user of the mobile terminal 100 may get prior knowledge of how an angle code is set from the notification information.

Upon selection of a Next icon 545 in the angle code guide screen 540, the mobile terminal 100 may display a first angle setting screen 550 on the display unit 151, as illustrated in FIG. 5a(v). Therefore, the user of the mobile terminal 100 sets a first angle by dragging in a first direction along the circumference of an indicator 551 in the first angle setting screen 550.

Upon selection of a Next icon 553 in the first angle setting screen 550 after the first angle is set, the mobile terminal 100 may display a second angle setting screen 560 on the display unit 151, as illustrated in FIG. 5a(vi). Likewise, the user of the mobile terminal 100 sets a second angle by dragging in a second direction along the circumference of an indicator 561 in the second angle setting screen 560. Preferably, the second angle is set to a different value from the first angle.

Upon selection of a Next icon 563 in the second angle setting screen 560 after the second angle is set, the mobile terminal 100 may display, on the display unit 151, a display information setting screen 570 for setting information to be displayed temporarily on the display unit 151 according to an input of the first angle. The display information setting screen 570 may include options such as weather widget information, time widget information, traffic widget information, schedule widget information, etc. in addition to first angle information θ1. Accordingly, the user may select one of various types of display information in the display information setting screen 570.

Upon selection of a Next icon 575 in the display information setting screen 570 after the display information is set, the mobile terminal 100 may display a shortcut setting screen 580 for setting an operation to be performed simultaneously with release of a lock screen according to an input of the second angle on the display unit 151. The shortcut setting screen 580 may include options such as home screen, camera app, gallery app, call app, message app, messenger app, etc. in addition to second angle information θ2. Accordingly, the user may select one of the various available functions in the shortcut setting screen 580.

While not shown, it will be apparent to those skilled in the art that a plurality of second angles and a plurality of functions corresponding to the second angles may be set by repeating at least a part of the above operations.

Figure 6:
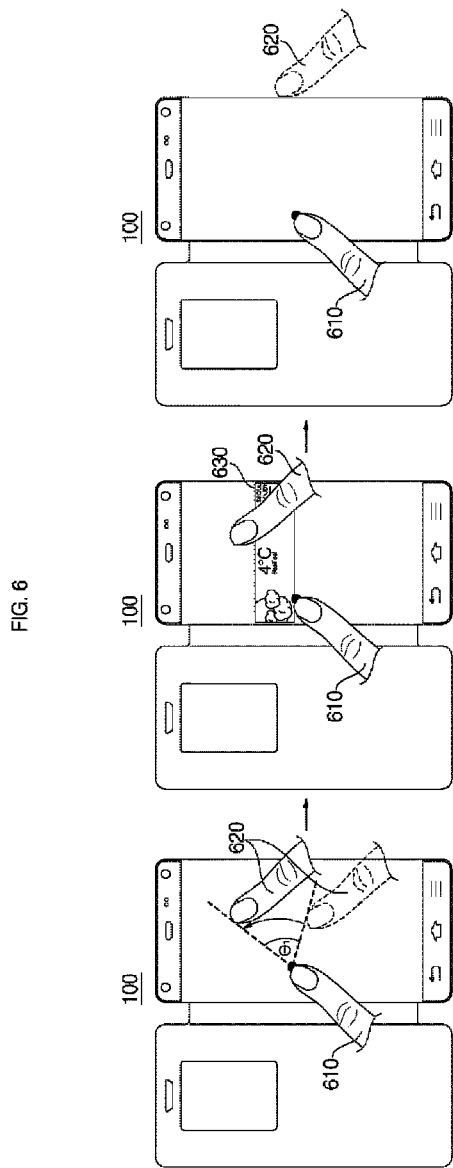
FIG. 6 illustrates an operation of a mobile terminal for displaying predetermined information based on a first angle of a multi-touch input.

FIG. 6 is a view referred to for describing an operation of a mobile terminal for displaying predetermined information based on a first angle of a multi-touch input.

Referring to FIG. 6, upon selection of an external key for entering the sleep mode or upon elapse of a predetermined time without any user input, the mobile terminal 100 switches from the active mode to the sleep mode, for power saving or other purposes.

In the sleep mode, the mobile terminal 100 determines whether a touch input applied by a first finger 610 has been received at a point of the display unit 151.

Upon receipt of the touch input applied by the first finger 610, the mobile terminal 100 determines whether a first drag input applied in a counterclockwise direction by a second finger 620 has been received in an area near to the point touched by the first finger 610.

Upon receipt of the first drag input applied by the second finger 620, the mobile terminal 100 calculates an angle between a first line connecting the reception point of the touch input to a starting point of the first drag input and a second line connecting the reception point of the touch input to an ending point of the first drag input.

If the angle between the first and second lines is the preset first angle θ1, the mobile terminal 100 may switch from the sleep mode to the active mode and then display predetermined weather widget information 630 corresponding to the first angle in an area of the display unit 151. The weather widget information 630 is preferably displayed only during a time period over which the second finger 620 keeps touching the ending point of the first drag input.

And then, if the second finger 620 is lifted off the ending point of the first drag input on the screen, the mobile terminal 100 returns to the sleep mode. Therefore, the mobile terminal 100 turns off the screen displayed on the display unit 151.

FIG. 7 is a view referred for describing an operation of a mobile terminal for displaying a lock screen based on a first angle of a multi-touch input.

Referring to FIG. 7, the mobile terminal 100 determines in the sleep mode whether a touch input applied by a first finger 710 has been received at a point of the display unit 151.

Upon receipt of the touch input applied by the first finger 710, the mobile terminal 100 determines whether a first drag input applied in a counterclockwise direction by a second finger has been received, with the touch input received. In addition, the mobile terminal 100 determines whether the second finger 720 keeps touching an ending point of the first drag input for a predetermined time and then is lifted off the display unit 151.

If the second finger 720 successively applies the first drag input and the touch release input, the mobile terminal 100 calculates an angle between a first line connecting the reception point of the touch input to a starting point of the first drag input and a second line connecting the reception point of the touch input to the ending point of the first drag input.

If the angle between the first and second lines is the preset first angle θ1, the mobile terminal 100 may switch from the sleep mode to the active mode and display a lock screen 730 on the display unit 151. According to another embodiment, the lock screen 730 may be displayed on the display unit 151 only when both the touch inputs applied by the first and second fingers 710 and 720 are released.

FIGS. 8*a* to 8*d* and 9*a* to 9*d* are views referred to for describing an operation of a mobile terminal for performing a predetermined operation simultaneously with releasing a screen lock state, based on first and second angles of a multi-touch input.

Referring to FIGS. 8*a* to 8*d* and 9*a* to 9*d*, the mobile terminal 100 determines in the sleep mode whether a touch input applied by a first finger 810 has been received at a point of the display unit 151.

Upon receipt of the touch input applied by the first finger 810, the mobile terminal 100 determines whether a first drag input applied in a counterclockwise direction by a second finger 820 has been received in an area near to the point touched by the first finger 810, with the touch input received.

Upon receipt of the first drag input applied by the second finger 820, the mobile terminal 100 calculates an angle between a first line connecting the reception point of the touch input to a starting point of the first drag input and a second line connecting the reception point of the touch input to an ending point of the first drag input.

If the angle between the first and second lines is the preset first angle θ1, the mobile terminal 100 may switch from the sleep mode to the active mode and display predetermined weather widget information 830 corresponding to the first angle θ1 in an area of the display unit 151.

The mobile terminal 100 determines whether a second drag input applied in a clockwise direction by the second finger 820 has been received successively, starting from the ending point of the first drag input.

Upon receipt of the second drag input applied by the second finger 820, the mobile terminal 100 calculates an angle between a third line connecting the reception point of the touch input to a starting point of the second drag input and a fourth line connecting the reception point of the touch input to an ending point of the second drag input.

Figures 8A, 8B:
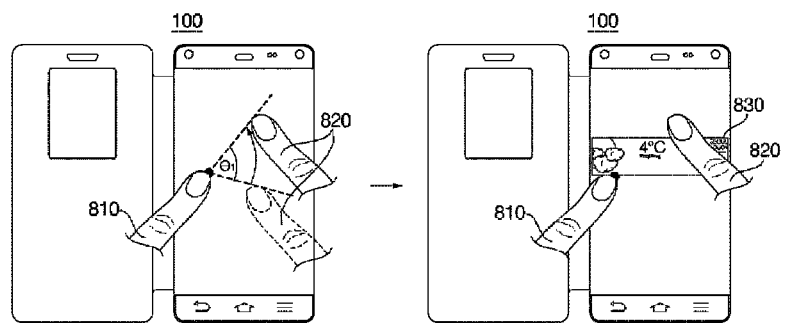
FIGS. 8a to 8d and 9a to 9d illustrate an operation of a mobile terminal for performing a predetermined operation simultaneously with releasing a screen lock state based on first and second angles of a multi-touch input.
Figures 8C, 8D:
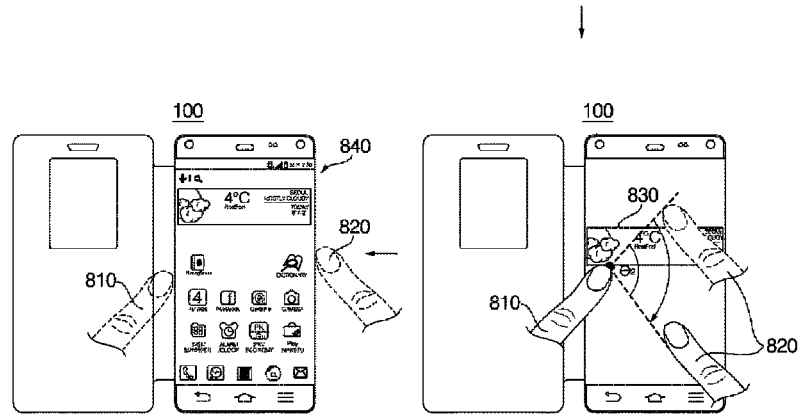

If the angle between the third and fourth lines is the preset second angle θ2, the mobile terminal 100 may display a predetermined home screen 840 simultaneously with releasing the screen lock state, as illustrated in FIG. 8*d*.

Figure 9A:
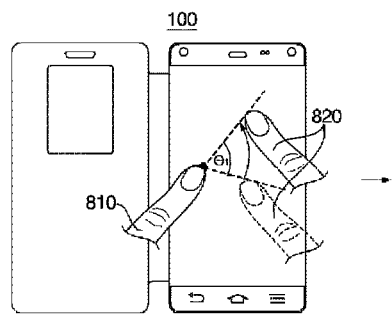
Figure 9B:
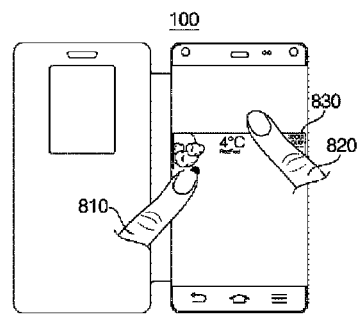
Figures 9C, 9D:
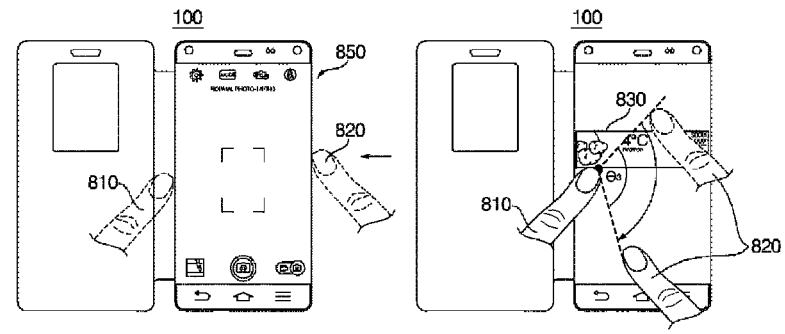

If the angle between the third and fourth lines is a preset third angle θ3, the mobile terminal 100 may immediately execute a predetermined camera application simultaneously with releasing the screen lock state, as illustrated in FIG. 9*d*.

According to another embodiment, if the angle between the third and fourth lines is a user-preset angle, the mobile terminal 100 may display a previous operation screen (i.e. an operation screen displayed before the sleep mode is placed) on the display unit 151, simultaneously with releasing the screen lock state.

FIG. 10 is a view referred for describing an operation of a mobile terminal for displaying predetermined information based on a first angle of a multi-touch input, while a protection cover is closed in the mobile terminal.

Referring to FIG. 10, the mobile terminal 100 determines whether a touch input applied by a first finger 1010 has been received at a point of a display area corresponding to the quick window 52 in the sleep mode.

Upon receipt of the touch input applied by the first finger 1010, the mobile terminal 100 determines whether a first drag input applied in a counterclockwise direction by a second finger 1020 has been received in an area near to the point touched by the first finger 1010.

Upon receipt of the first drag input applied by the second finger 1020, the mobile terminal 100 calculates an angle between a first line connecting the reception point of the touch input to a starting point of the first drag input and a second line connecting the reception point of the touch input to an ending point of the first drag input.

If the angle between the first and second lines is the preset first angle θ1, the mobile terminal 100 may switch from the sleep mode to the active mode and display predetermined clock widget information 1030 corresponding to the first angle θ1 in the display area corresponding to the quick window 52.

If the second finger 1020 is lifted off the ending point of the first drag input, the mobile terminal 100 returns to the sleep mode. Therefore, the mobile terminal 100 turns off the screen displayed in the display area corresponding to the quick window 52.

FIG. 11a to 11d is a view referred for describing an operation of a mobile terminal for performing a predetermined operation simultaneously with releasing a screen lock state based on first and second angles of a multi-touch input, while a protection cover is closed in the mobile terminal.

Referring to FIG. 11a to 11d, the mobile terminal 100 determines whether a touch input applied by a first finger 1110 has been received at a point of a display area corresponding to the quick window 52 in the sleep mode.

Upon receipt of the touch input applied by the first finger 1110, the mobile terminal 100 determines whether a first drag input applied in a counterclockwise direction by a second finger 1120 has been received in an area near to the point touched by the first finger 1110.

Upon receipt of the first drag input applied by the second finger 1120, the mobile terminal 100 calculates an angle between a first line connecting the reception point of the touch input to a starting point of the first drag input and a second line connecting the reception point of the touch input to an ending point of the first drag input.

If the angle between the first and second lines is the preset first angle θ1, the mobile terminal 100 may switch from the sleep mode to the active mode and display predetermined clock widget information 1130 corresponding to the first angle θ1 in the display area corresponding to the quick window 52.

The mobile terminal 100 determines whether a second drag applied in a clockwise direction by the second finger 1120 has been received successively, starting from the ending point of the first drag input.

Upon receipt of the second drag input applied by the second finger 1120, the mobile terminal 100 calculates an angle between a third line connecting the reception point of the touch input to a starting point of the second drag input and a fourth line connecting the reception point of the touch input to an ending point of the second drag input.

If the angle between the third and fourth lines is the preset second angle θ2, the mobile terminal 100 immediately execute a predetermined multimedia application corresponding to the second angle θ2, simultaneously with releasing the screen lock state. Therefore, the mobile terminal 100 may display a multimedia play screen 1140 in the display area corresponding to the quick window 52, as illustrated in FIG. 11d.

FIG. 12 is a view referred for describing an operation of a smart watch for performing a predetermined operation simultaneously with releasing a screen lock state based on first and second angles of a multi-touch input.

Referring to FIG. 12, the smart watch 200 determines whether a touch input applied by a first finger 1210 has been received at a point of a boundary of the display unit 251 in a watch mode.

Upon receipt of the touch input applied by the first finger 1210, the smart watch 200 determines whether a first drag input applied in a clockwise direction by a second finger 1220 has been received along the boundary of the display unit 251.

Upon receipt of the first drag input applied by the second finger 1220, the smart watch 200 calculates an angle between a first line connecting the reception point of the touch input to a starting point of the first drag input and a second line connecting the reception point of the touch input to an ending point of the first drag input.

Then, the mobile terminal 100 determines whether a second drag input applied in a counterclockwise direction by the second finger 1220 has been received successively, starting from the ending point of the first drag input.

Upon receipt of the second drag input applied by the second finger 1220, the mobile terminal 100 calculates an angle between a third line connecting the reception point of the touch input to a starting point of the second drag input and a fourth line connecting the reception point of the touch input to an ending point of the second drag input.

If the angle between the first line and the second line is the preset first angle θ1 and the angle between the third and fourth lines is the preset second angle θ2, the smart watch 200 displays a home screen 1240 on the display unit 251, that is, switches the smart watch 200 from the watch mode to a smart mode, simultaneously with releasing the screen lock state.

According to another embodiment, if the angle between the first line and the second line is the preset first angle θ1 and the angle between the third and fourth lines is the preset second angle θ2, the smart watch 200 may display a predetermined lock pattern screen (not shown) in an area of a watch screen 1230.

Figure 13:
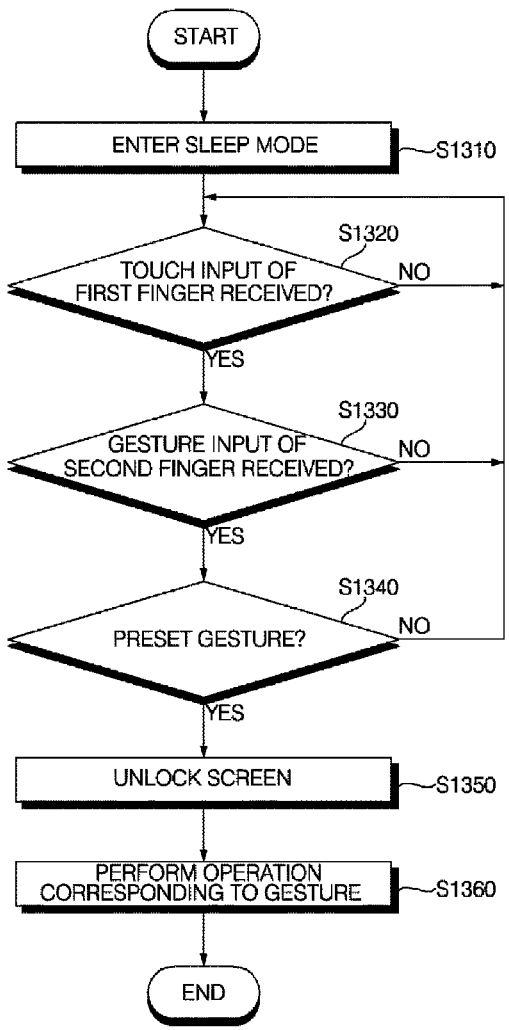
FIG. 13 is a flowchart illustrating an operation of a mobile terminal according to another embodiment of the present invention.

FIG. 13 is a flowchart illustrating an operation of a mobile terminal according to another embodiment of the present invention.

Referring to FIG. 13, the controller 180 displays an operation screen corresponding to a menu or operation selected by a user command or the like on the display unit 151.

Upon selection of an external key for entering a sleep mode or upon elapse of a predetermined time without any user input while the operation screen is displayed, the controller 180 switches the mobile terminal 100 from the active mode to the sleep mode, for power saving or other purposes (S1310).

The controller 180 determines in the sleep mode whether a touch input applied by a first finger has been received at a point of the display unit 151 (S1320).

Upon receipt of the touch input applied by the first finger in step S1320, the controller 180 determines whether a gesture input applied by a second finger has been received in an area near to the point touched by the first finger, with the touch input received (S1330). The gesture input may be, but not limited to, a touch and drag input in the form of a letter or a number or a touch and drag input applied in a horizontal or vertical direction so that a display area may be divided.

Upon receipt of the gesture input applied by the second finger in step S1330, the controller 180 determines whether the received gesture input is a predetermined gesture input (S1340).

If the received gesture input is the predetermined gesture input in step S1340, the controller 180 switches the mobile terminal 100 from the sleep mode to the active mode. Then the controller 180 immediately performs a predetermined operation corresponding to the gesture input, simultaneously with releasing a screen lock state (S1350 and S1360).

As described above, the mobile terminal may immediately perform a predetermined operation simultaneously with releasing a screen lock state based on gesture information about a multi-touch input to the touch screen in the sleep mode according to the embodiment of the present invention.

Figure 14A:
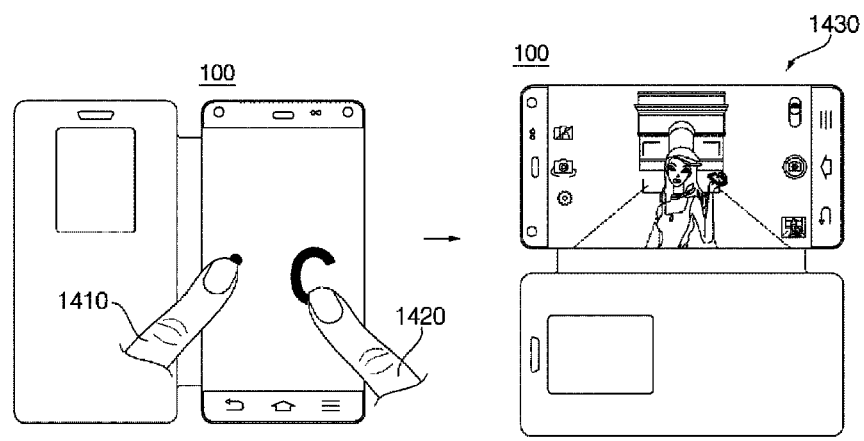
FIGS. 14a and 14b illustrate an operation of a mobile terminal for executing a predetermined application simultaneously with releasing a screen lock state, based on a letter-shaped gesture input.
Figure 14B:
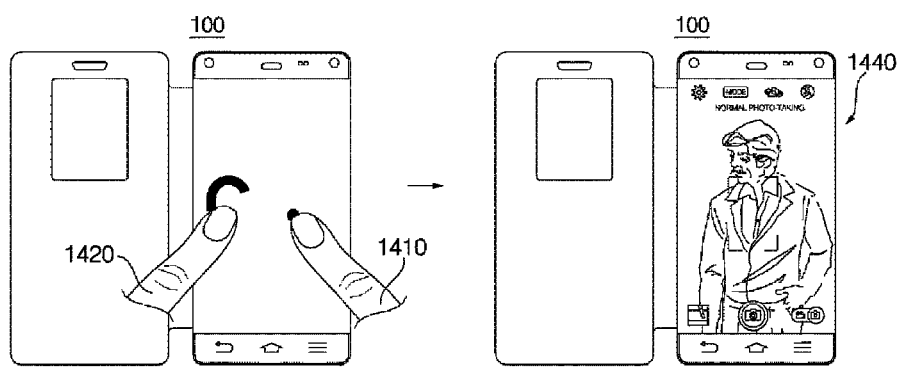

FIGS. 14a and 14b are a view referred to for describing an operation of a mobile terminal for executing a predetermined application simultaneously with releasing a screen lock state, based on a letter-shaped gesture input.

Referring to FIGS. 14a and 14b, the mobile terminal 100 determines whether a touch input applied by a first finger 1410 has been received at a point of the display unit 151 in the sleep mode.

Upon receipt of the touch input applied by the first finger 1410, the mobile terminal 100 determines whether a gesture input applied by a second finger 1420 has been received in an area near to the point touched by the first finger 1410, with the touch input received. The following description is given on the assumption that the gesture input applied by the second finger 1420 is a touch and drag input in the form of letter 'C'.

If the gesture input applied by the second finger 1420 is a predetermined gesture input, the mobile terminal 100 switches from the sleep mode to the active mode. Then, the mobile terminal 100 immediately executes a predetermined camera application corresponding to the gesture input, simultaneously with releasing a screen lock state.

Referring to FIG. 14a, upon receipt of a gesture input applied by the second finger 1420 in a right area with respect to a point touched by the first finger 1410, the mobile terminal 100 may display a preview image 1430 on the display unit 151 by operating the rear camera 121b.

Referring to FIG. 14b, upon receipt of a gesture input applied by the second finger 1420 in a left area with respect to a point touched by the first finger 1410, the mobile terminal 100 may display a preview image 1440 on the display unit 151 by operating the front camera 121a.

Figure 15A:
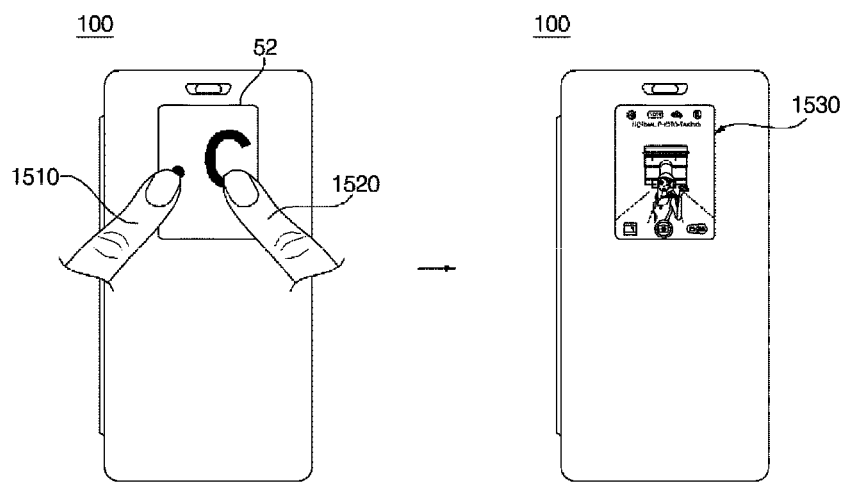
FIGS. 15a and 15b illustrate an operation of a mobile terminal for executing a predetermined application simultaneously with releasing a screen lock state, based on a letter-shaped gesture input, while a protection cover is closed in the mobile terminal.
Figure 15B:
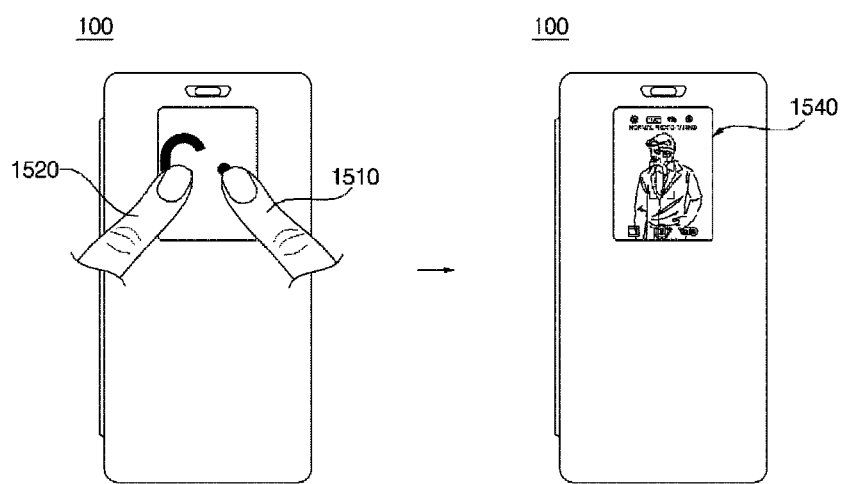

FIGS. 15a and 15b are a view referred to for describing an operation of a mobile terminal for executing a predetermined application simultaneously with releasing a screen lock state, based on a letter-shaped gesture input, while a protection cover is closed in the mobile terminal.

Referring to FIGS. 15a and 15b, the mobile terminal 100 determines whether a touch input applied by a first finger 1510 has been received in a display area corresponding to the quick window 52 in the sleep mode.

Upon receipt of the touch input applied by the first finger 1510, the mobile terminal 100 determines whether a gesture input applied by a second finger 1520 has been received in an area near to the point touched by the first finger 1510. The following description is given on the assumption that the gesture input applied by the second finger 1520 is a touch and drag input in the form of letter 'C'.

If the gesture input applied by the second finger 1520 is a predetermined gesture input, the mobile terminal 100 switches from the sleep mode to the active mode. Then, the mobile terminal 100 immediately executes a predetermined camera application corresponding to the gesture input, simultaneously with releasing a screen lock state.

Referring to FIG. 15a, upon receipt of a gesture input applied by the second finger 1520 in a right area with respect to a point touched by the first finger 1510, the mobile terminal 100 may display a preview image 1530 in a display area corresponding to the quick window 52 by operating the rear camera 121b.

Referring to FIG. 15b, upon receipt of a gesture input applied by the second finger 1520 in a left area with respect to a point touched by the first finger 1510, the mobile terminal 100 may display a preview image 1540 in a display area corresponding to the quick window 52 by operating the front camera 121a.

Figure 16A:
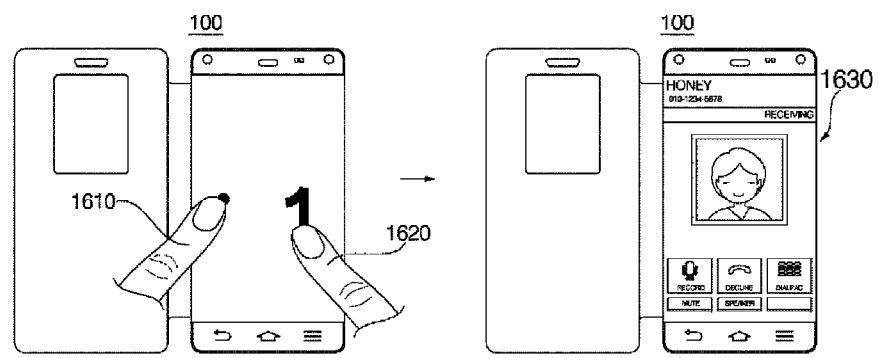
FIGS. 16a and 16b illustrate an operation of a mobile terminal for executing a predetermined application simultaneously with releasing a screen lock state, based on a number-shaped gesture input.
Figure 16B:
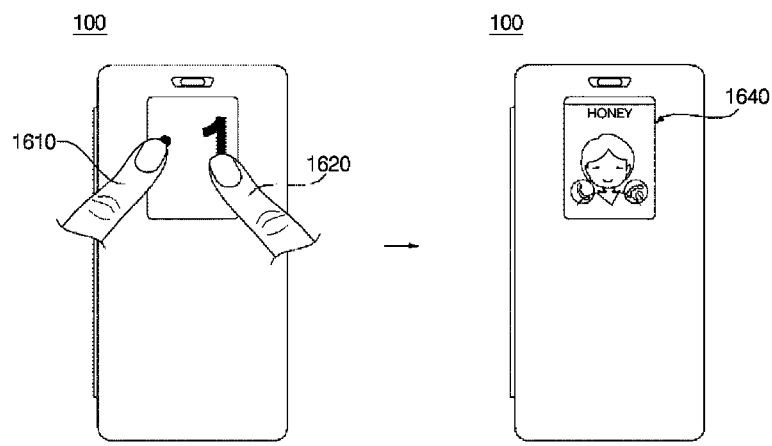

FIGS. 16a and 16b are a view referred to for describing an operation of a mobile terminal for executing a predetermined application simultaneously with releasing a screen lock state, based on a number-shaped gesture input.

Referring to FIGS. 16a and 16b, the mobile terminal 100 determines whether a touch input applied by a first finger 1610 has been received at a point of the display unit 151 in the sleep mode.

Upon receipt of the touch input applied by the first finger 1610, the mobile terminal 100 determines whether a gesture input applied by a second finger 1620 has been received in an area near to the point touched by the first finger 1610, with the touch input received. The following description is given on the assumption that the gesture input applied by the second finger 1620 is a touch and drag input in the form of number '1'.

If the gesture input applied by the second finger 1620 is a predetermined gesture input, the mobile terminal 100 switches from the sleep mode to the active mode. Then, the mobile terminal 100 immediately executes a predetermined call application corresponding to the gesture input, simultaneously with releasing a screen lock state.

Referring to FIG. 16a, the mobile terminal 100 may display a call origination screen 1630 requesting an outgoing call to a portable terminal of a person corresponding to hot number 1, on the display unit 151.

Referring to FIG. 16b, upon receipt of the same touch input and gesture input with the protection cover closed, the mobile terminal 100 may display a call origination screen 1640 requesting an outgoing call to a portable terminal of a person corresponding to hot number 1, in a display area corresponding to the quick window 52.

Figure 17A:
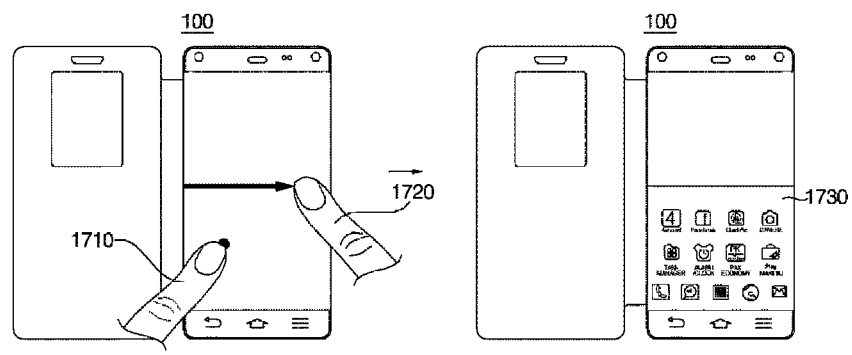
FIGS. 17a and 17b illustrate an operation of a mobile terminal for activating a partial display area simultaneously with releasing a screen lock state, based on relative positions of a touch input and a drag input.
Figure 17B:
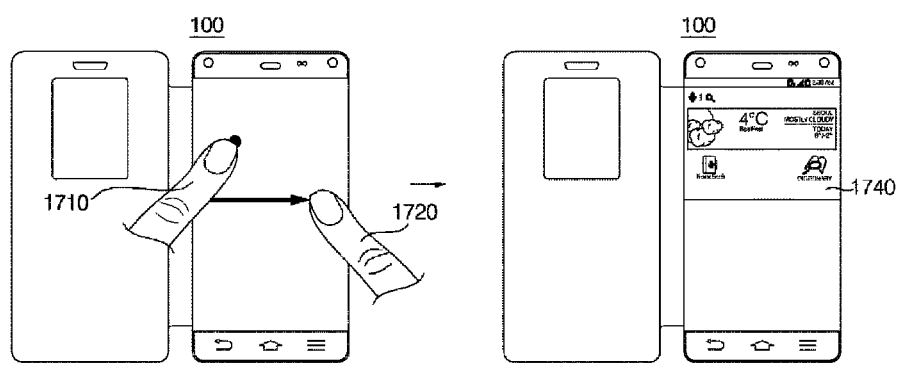

FIGS. 17a and 17b are a view referred to for describing an operation of a mobile terminal for activating a partial display area simultaneously with releasing a screen lock state, based on relative positions of a touch input and a drag input.

Referring to FIGS. 17a and 17b, the mobile terminal 100 determines whether a touch input applied by a first finger 1710 has been received at a point of the display unit 151 in the sleep mode.

Upon receipt of the touch input applied by the first finger 1710, the mobile terminal 100 determines whether a drag input applied by a second finger 1720 has been received in an upper or lower area with respect to the point touched by the first finger 1710.

Upon receipt of the drag input applied by the second finger 1720, the mobile terminal 100 switches from the sleep mode to the active mode. Then, the mobile terminal 100 activates only a partial display area, simultaneously with releasing a screen lock state.

Referring to FIG. 17a, upon receipt of a drag input applied by the second finger 1720 in an upper area with respect to a point touched by the first finger 1710, the mobile terminal 100 may activate only a lower display area 1730 with respect to the drag input.

Referring to FIG. 17b, upon receipt of a drag input applied by the second finger 1720 in a lower area with respect to a point touched by the first finger 1710, the mobile terminal 100 may activate only an upper display area 1740 with respect to the drag input.

Figure 18A:
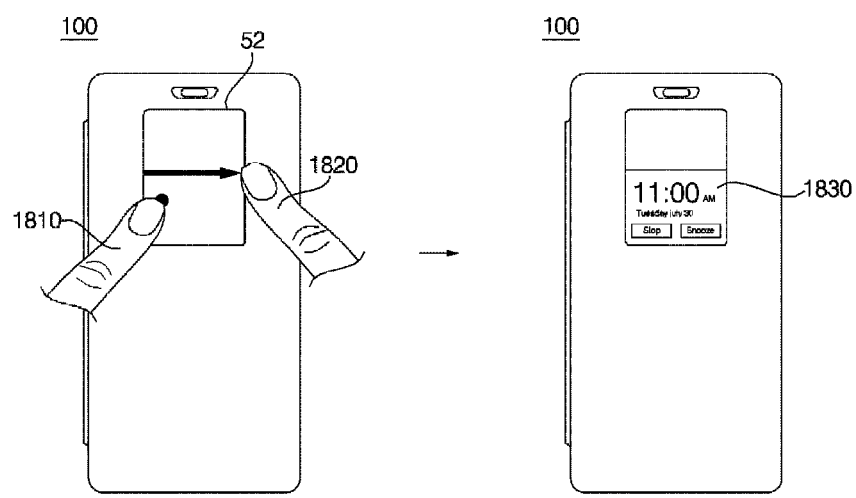
FIGS. 18a and 18b illustrate an operation of a mobile terminal for activating a partial display area simultaneously with releasing a screen lock state, based on relative positions of a touch input and a drag input, while a protection cover is closed in the mobile terminal.
Figure 18B:
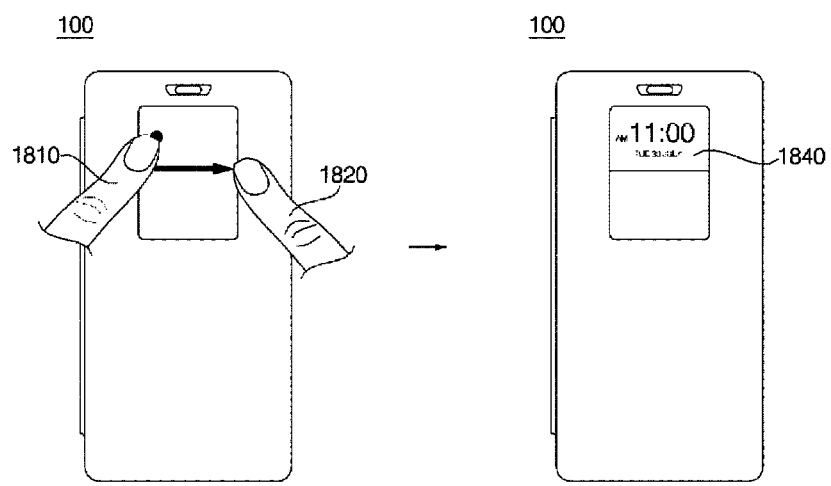

FIGS. 18a and 18b are a view referred to for describing an operation of a mobile terminal for activating a partial display area simultaneously with releasing a screen lock state, based on relative positions of a touch input and a drag input, while a protection cover is closed in the mobile terminal.

Referring to FIGS. 18a and 18b, the mobile terminal 100 determines whether a touch input applied by a first finger 1810 has been received at a point of a display area corresponding to the quick window 52 in the sleep mode.

Upon receipt of the touch input applied by the first finger 1810, the mobile terminal 100 determines whether a drag input applied by a second finger 1820 has been received in an upper or lower area with respect to the point touched by the first finger 1810.

Upon receipt of the drag input applied by the second finger 1820, the mobile terminal 100 switches from the sleep mode to the active mode. Then, the mobile terminal 100 activates only a partial display area, simultaneously with releasing a screen lock state.

Referring to FIG. 18a, upon receipt of a drag input applied by the second finger 1820 in an upper area with respect to a point touched by the first finger 1810, the mobile terminal 100 may activate only a lower display area 1830 with respect to the drag input.

Referring to FIG. 18b, upon receipt of a drag input applied by the second finger 1820 in a lower area with respect to a point touched by the first finger 1810, the mobile terminal 100 may activate only an upper display area 1840 with respect to the drag input.

Figure 19:
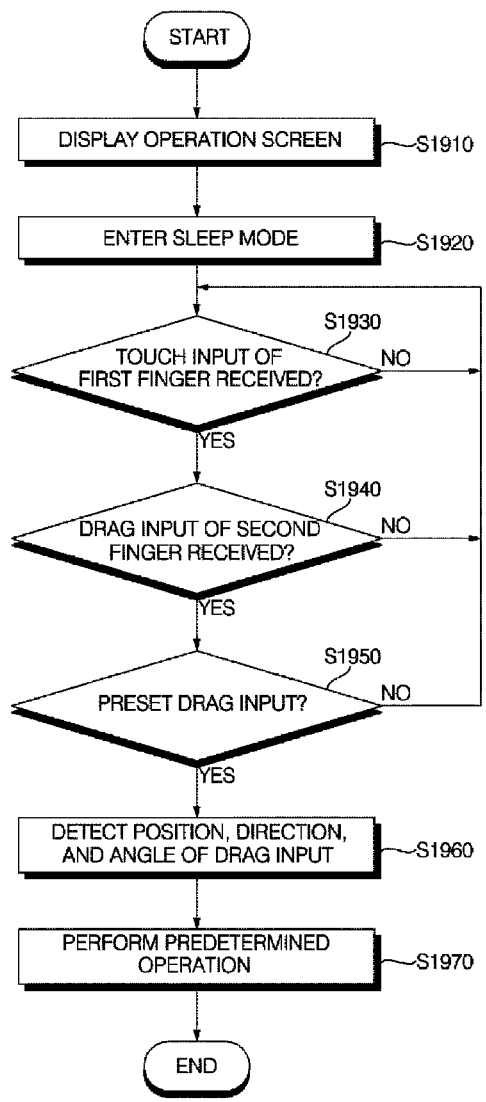
FIG. 19 is a flowchart illustrating an operation of a mobile terminal according to another embodiment of the present invention.

FIG. 19 is a flowchart illustrating an operation of a mobile terminal according to another embodiment of the present invention.

Referring to FIG. 19, the controller 180 displays an operation screen corresponding to a menu or operation selected by a user command or the like on the display unit 151 (S1910). The displayed operation screen may be, for example, any of a home screen, an App screen, a message screen, a call screen, an image or video viewer screen, a broadcasting screen, a map screen, a Web page screen, various application execution screens, etc.

Upon selection of an external key for entering a sleep mode or upon elapse of a predetermined time without any user input while the operation screen is displayed, the controller 180 switches the mobile terminal 100 from the active mode to the sleep mode, for power saving or other purposes (S1920).

The controller 180 determines in the sleep mode whether a touch input applied by a first finger has been received at a point of the display unit 151 (S1930).

Upon receipt of the touch input applied by the first finger in step S1930, the controller 180 determines whether a drag input applied by a second finger has been received in a first direction in an area adjacent to the point touched by the first finger, with the touch input received (S1940). The first direction may be a clockwise or counterclockwise direction.

Upon receipt of the drag input applied by the second finger in step S1940, the controller 180 determines whether the received drag input is a predetermined drag input (S1950).

If the received drag input is the predetermined drag input in step S1950, the controller 180 detects at least one of a position, direction, or angle of the drag input (S1960).

The controller 180 executes a predetermined function corresponding to the at least one of the position, direction, or angle of the drag input, while maintaining the sleep mode (S1970). The predetermined function may be an operation control function related to an application executed in the mobile terminal 100 before the mobile terminal 100 enters the sleep mode. Accordingly, the user may readily control an operation of an ongoing application executed as a background process based on a multi-touch input to the touch screen, without the need for turning on the screen.

FIGS. 20a to 20d is a view referred to for describing an operation of a mobile terminal for controlling a function of an ongoing application executed as a background process, based on a multi-touch input to a touch screen.

Referring to FIGS. 20a to 20d, the mobile terminal 100 displays a multimedia play screen 2010 on the display unit 151 according to a user command or the like.

Upon selection of an external key for entering the sleep mode or upon elapse of a predetermined time without any user input with the multimedia play screen 2010 displayed, the mobile terminal 100 switches from the active mode to the sleep mode, for power saving or other purposes.

In the sleep mode, the mobile terminal 100 determines whether a touch input applied by a first finger 2020 has been received at a point of the display unit 151.

Upon receipt of the touch input applied by the first finger 2020, the mobile terminal 100 determines whether a drag input applied in a clock or counterclockwise direction by a second finger 2030 has been received in an area near to the point touched by the first finger 2020, with the touch input received.

Figure 20:
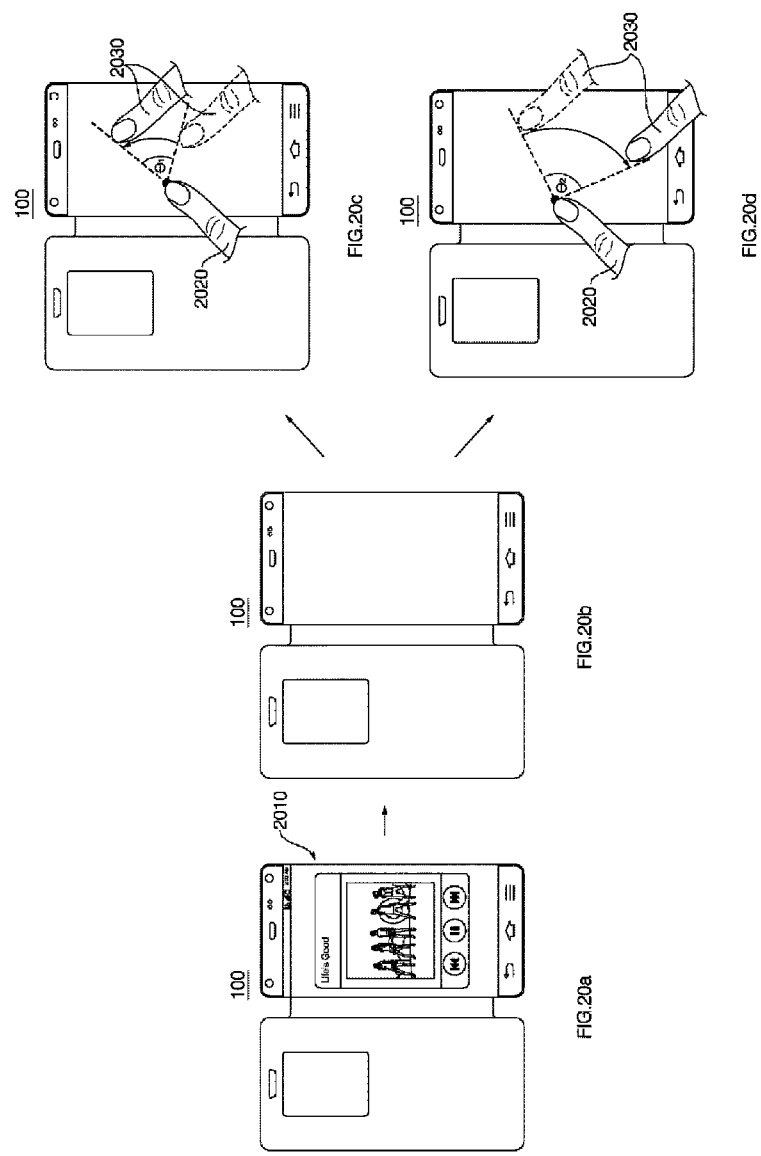
FIGS. 20a to 20d illustrate an operation of a mobile terminal for controlling a function of an ongoing application executed as a background process based on a multi-touch input to a touch screen.

Referring to FIG. 20c, upon receipt of a counterclockwise drag input applied by the second finger 2030, the mobile terminal 100 may execute a predetermined first function corresponding to the direction and angle of the drag input, while maintaining the sleep mode.

Referring to FIG. 20d, upon receipt of a clockwise drag input applied by the second finger 2030, the mobile terminal 100 may execute a predetermined second function corresponding to the direction and angle of the drag input, while maintaining the sleep mode. The predetermined first and second functions may be operation control functions related to the ongoing multimedia play screen executed as a background process.

Figure 21:
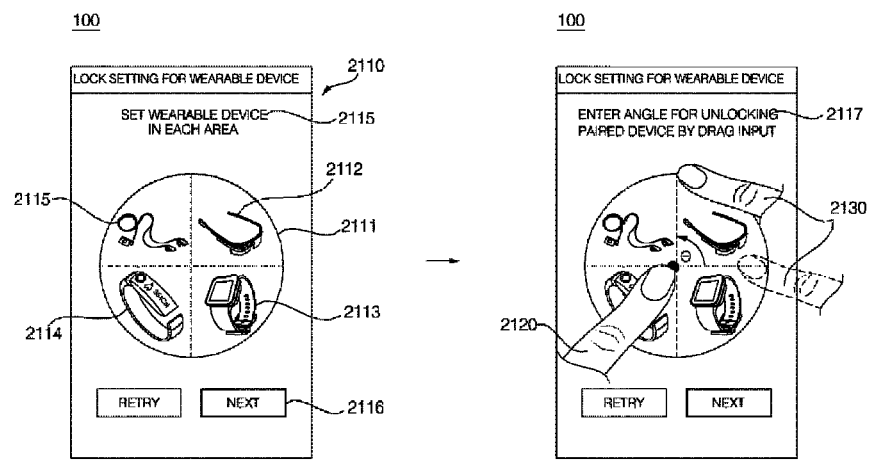

FIGS. 21 and 22 are views referred to for describing an operation of a mobile terminal for unlocking a wearable device based on a multi-touch input to a touch screen.

Referring to FIG. 21, the mobile terminal 100 displays a lock setting screen 2110 on the display unit 151 to set a function of locking a wearable device according to a user command or the like. The lock setting screen 2110 displays a circular indicator 2111 divided into four areas and four wearable devices 2112, 2113, 2114, and 2115 included in the respective areas, along with notification information 2115 describing how a wearable device is set in each area.

The user of the mobile device 100 may set an intended wearable device in each area by dragging and dropping the wearable device in the area.

Then, upon selection of a Next icon 2116 displayed at a bottom part of the lock setting screen 2110, the mobile terminal 100 displays notification information 2117 saying 'Enter angle for unlocking paired wearable device by drag input' on the lock setting screen 2110. Accordingly, the user of the mobile terminal 100 inputs an angle for unlocking the paired wearable device by applying a touch input using a first finger 2120 and a drag input using a second finger 2130.

A series of UIs for setting a lock function for a wearable device are purely exemplary and thus those skilled in the art will understand clearly that the UIs may be implemented in many other manners.

Referring to FIG. 22, the mobile terminal 100 establishes a short-range wireless communication channel with at least one wearable device according to a user command or the like. The mobile terminal 100 exchanges data with the wearable device through the short-range wireless communication channel. Accordingly, the user of the mobile terminal 100 may use data processed in the mobile terminal 100 through the wearable device.

Upon selection of an external key for entering the sleep mode or upon elapse of a predetermined time without any user input in this state, the mobile terminal 100 switches from the active mode to the sleep mode, power saving or other purposes. In addition, the mobile terminal 100 may switch the paired wearable device from the active mode to the sleep mode.

In the sleep mode, the mobile terminal 100 determines whether a touch input applied by a first finger 2210 has been received at a point of the display unit 151.

Upon receipt of the touch input applied by the first finger 2210, the mobile terminal 100 determines whether a drag input applied in a counterclockwise direction by a second finger 2220 has been received in an area near to the point touched by the first finger 2210, with the touch input received.

Upon receipt of the drag input applied by the second finger 2220, the mobile terminal 100 detects the area in which the drag input has been received. Further, the mobile terminal 100 calculates an angle between a first line connecting the reception point of the touch input to a starting point of the drag input and a second line connecting the reception point of the touch input to an ending point of the drag input.

If the angle between the first and second lines is a predetermined angle, the mobile terminal 100 switches a predetermined wearable device (i.e., smart glasses 2230) corresponding to the detected area from the sleep mode to the active mode. The mobile terminal 100 unlocks the smart glasses 220 and displays an operation screen 2240 in an area of the smart glasses 2230.

As is apparent from the above description, the mobile terminal and the method for controlling the same according to the present invention have the following effects.

According to at least one of the embodiments of the present invention, more various patterns of user inputs for releasing a screen lock state can be produced by providing a screen lock function based on a multi-touch input.

According to at least one of the embodiments of the present invention, a lock screen can be unlocked more conveniently and more rapidly than in a conventional method by providing a screen lock function based on a multi-touch input.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal comprising:
a touch screen; and
a controller configured to:
cause the mobile terminal to enter a sleep mode;
receive a touch input applied to a first point of the touch screen during the sleep mode;
receive a first drag input applied from a second point to a third point of the touch screen while the touch input is maintained, wherein a first angle is defined between a line that extends from the first point to the second point and a line that extends from the first point to the third point;
perform a first operation when the first angle meets or exceeds a first threshold angle;
receive a second drag input applied from the third point to a fourth point of the touch screen while the touch input is maintained, wherein a second angle is defined between the line that extends from the first point to the third point and a line that extends from the first point to the fourth point; and
perform a second operation that is different from the first operation when the second angle meets or exceeds a second threshold angle ,
wherein the performing the second operation comprises releasing the mobile terminal from a screen lock state.

2. The mobile terminal according to claim 1, wherein the touch input is applied by a first finger of a user and the first and second drag inputs are applied by a second finger of the user.

3. The mobile terminal according to claim 1, wherein the performing the first operation comprises:
switching the mobile terminal from the sleep mode to an active mode; and
displaying, on the touch screen, widget information corresponding to the first angle.

4. The mobile terminal according to claim 3, wherein the controller is further configured to cause the touch screen to stop displaying the widget information in response to releasing of the first drag input from the third point.

5. The mobile terminal according to claim 1, wherein the performing the first operation comprises causing the touch screen to display a lock screen.

6. The mobile terminal according to claim 1, wherein the controller is further configured to execute an application corresponding to the second angle when the mobile terminal is released from the screen lock state.

7. The mobile terminal according to claim 1, wherein the controller is further configured to cause the touch screen to display an operation screen that was displayed prior to entering the sleep mode when the mobile terminal is released from the screen lock state.

8. The mobile terminal according to claim 1, wherein:
the first drag input and the second drag input are applied in opposite directions; and
the second drag input is received continuously after receiving the first drag input.

9. The mobile terminal according to claim 1, wherein:
the mobile terminal is engaged with a cover located relative to the touch screen and being positionable between open and closed positions;
the cover is shaped to define an opening;
when the cover is in the open position, an entire portion of the touch screen is exposed;
when the cover is in the closed position, a first portion of the touch screen is obscured while a second portion of the touch screen is exposed via the opening of the cover; and
the touch input, the first drag input and the second drag input are applied via the second portion of the touch screen while the cover is in the closed position.

10. A method for controlling a mobile terminal, the method comprising:
entering a sleep mode;
receiving a touch input applied to a first point of a touch screen during the sleep mode;
receiving a first drag input applied from a second point to a third point of the touch screen while the touch input is maintained, wherein a first angle is defined between a line that extends from the first point to the second point and a line that extends from the first point to the third point;
performing a first operation when the first angle meets or exceeds a first threshold angle;
receiving a second drag input applied from the third point to a fourth point of the touch screen while the touch input is maintained, wherein a second angle is defined between the line that extends from the first point to the third point and a line that extends from the first point to the fourth point; and
performing a second operation that is different from the first operation when the second angle meets or exceeds a second threshold angle,
wherein the performing the second operation comprises releasing the mobile terminal from a screen lock state.

11. The method according to claim 10, wherein the touch input is applied by a first finger of a user and the first and second drag inputs are applied by a second finger of the user.

12. The method according to claim 10, wherein the performing the first operation comprises:
switching the mobile terminal from the sleep mode to an active mode; and
displaying, on the touch screen, widget information corresponding to the first angle.

13. The method according to claim 12, further comprising stopping the displaying of the widget information in response to releasing of the first drag input from the third point.

14. The method according to claim 10, wherein the performing the first operation comprises displaying a lock screen on the touch screen.

15. The method according to claim 10, further comprising executing an application corresponding to the second angle when the mobile terminal is released from the screen lock state.

16. The method according to claim 10, further comprising displaying an operation screen that was displayed prior to entering the sleep mode when the mobile terminal is released from the screen lock state.

17. The method according to claim 10, wherein:
the first drag input and the second drag input are applied in opposite directions; and
the second drag input is received continuously after receiving the first drag input.

18. The method according to claim 10, wherein:
the mobile terminal is engaged with a cover located relative to the touch screen and being positionable between open and closed positions;
the cover is shaped to define an opening;
when the cover is in the open position, an entire portion of the touchscreen is exposed;
when the cover is in the closed position, a first portion of the touchscreen is obscured while a second portion of the touchscreen is exposed via the opening of the cover; and
the touch input, the first drag input and the second drag input are applied via the second portion of the touch screen while the cover is in the closed position.

* * * * *